(12) United States Patent
Constantinis

(10) Patent No.: US 12,038,394 B2
(45) Date of Patent: Jul. 16, 2024

(54) INSPECTION METHOD AND ASSOCIATED APPARATUS

(71) Applicant: E M & I (MARITIME) LIMITED, Saint Helier (GB)

(72) Inventor: Daniel Constantinis, Naxxar (MT)

(73) Assignee: E M & I (MARITIME) LIMITED, Saint Helier (GB)

( * ) Notice: Subject to any disclaimer, the term of this patent is extended or adjusted under 35 U.S.C. 154(b) by 585 days.

(21) Appl. No.: 17/046,327

(22) PCT Filed: Apr. 11, 2019

(86) PCT No.: PCT/GB2019/051044
§ 371 (c)(1),
(2) Date: Oct. 9, 2020

(87) PCT Pub. No.: WO2019/197829
PCT Pub. Date: Oct. 17, 2019

(65) Prior Publication Data
US 2022/0291151 A1 Sep. 15, 2022

(30) Foreign Application Priority Data
Apr. 11, 2018 (GB) .................................. 1806008

(51) Int. Cl.
*G01N 23/18* (2018.01)
*G01N 23/04* (2018.01)
*G06T 7/00* (2017.01)

(52) U.S. Cl.
CPC ............ *G01N 23/18* (2013.01); *G01N 23/04* (2013.01); *G06T 7/0004* (2013.01);
(Continued)

(58) Field of Classification Search
CPC .. G01N 23/18; G01N 23/04; G01N 2223/646; G01N 2223/301;
(Continued)

(56) References Cited

U.S. PATENT DOCUMENTS 2,821,634 A 1/1958 Myers et al.
3,210,547 A 10/1965 Eliot
(Continued)

FOREIGN PATENT DOCUMENTS

AU 2019250782 11/2023
BR 112020020669-5 4/2024
(Continued)

OTHER PUBLICATIONS

UK Intellectual Property Office, Examination Report in GB1806008.7, Jul. 23, 2021.
(Continued)

*Primary Examiner* — Courtney D Thomas
(74) *Attorney, Agent, or Firm* — Dorton & Willis LLP; Ryan Willis

(57) ABSTRACT

Method of inspecting hazardous area equipment (10, 110, 210). The method is a non-invasive inspection of an electrical or electronic component of the hazardous area equipment (10, 110, 210). The non-invasive inspection includes a radiographic inspection of the equipment (10, 110, 210).

18 Claims, 11 Drawing Sheets

(52) U.S. Cl.
CPC ............... *G01N 2223/646* (2013.01); *G06T 2207/10124* (2013.01); *G06T 2207/30164* (2013.01)

(58) Field of Classification Search
CPC ............ G01N 2223/632; G06T 7/0004; G06T 2207/10124; G06T 2207/30164
See application file for complete search history.

(56) References Cited

U.S. PATENT DOCUMENTS

| | | | |
|---|---|---|---|
| 6,341,153 B1 | 1/2002 | Rivera et al. | |
| 2004/0146140 A1 | 7/2004 | McCain | |
| 2007/0009086 A1 | 1/2007 | Yoshino | |
| 2009/0066939 A1* | 3/2009 | Venkatachalam | G01N 23/04 356/237.1 |
| 2014/0126695 A1* | 5/2014 | Stock | G01N 23/04 378/58 |
| 2014/0205058 A1 | 7/2014 | Tagawa | |
| 2016/0033426 A1 | 2/2016 | Georgeson et al. | |

FOREIGN PATENT DOCUMENTS

| | | |
|---|---|---|
| CN | 2035888 | 4/1989 |
| EP | 2667184 | 11/2013 |
| EP | 19 722 938.8 | 9/2022 |
| EP | 19 722 938.8 | 9/2023 |
| JP | H11218503 | 8/1999 |
| JP | 2004226127 | 8/2004 |
| JP | 2013047622 | 3/2013 |
| KR | 20160056424 | 5/2016 |
| SA | 520420316 | 3/2024 |
| WO | 2016165828 | 10/2016 |

OTHER PUBLICATIONS

GB Intellectual Property Office, Examination Report, dated Feb. 3, 2021, for Application No. GB1806008.7.
GB Intellectual Property Office, Search Report, dated Sep. 24, 2019, for Application No. GB1806008.7.
WIPO, Search Report, dated Jul. 24, 2019, for Application No. PCT/GB2019/51044.
Daniel Schneberk, et al., "Application of offset-CT scanning to the inspection of high power feeder lines and connections", AIP Conference Proceedings, Feb. 10, 2016.

* cited by examiner

Item 2: Ex e IIC GB T6 junction box with glanded cable connected (1/3)

Item 2: Ex e IIC GB T6 junction box with glanded cable connected (2/3)

Item 2: Ex e IIC GB T6 junction box with glanded cable connected (3/3)

Item 2: Ex e IIC GB T6 junction box with glanded cable connected (1/3)

Item 2: Ex e IIC GB T6 junction box with glanded cable connected (2/3)

Item 2: Ex e IIC GB T6 junction box with glanded cable connected (3/3)

Item 3: Ex d e op is IIB T4 Gb light fitting

INSPECTION METHOD AND ASSOCIATED APPARATUS

The present invention relates to a method of inspecting an object, particularly, but not exclusively, an object for, in or from a hazardous environment; and associated apparatus.

BACKGROUND

The Oil/Gas and indeed many other industries are concerned with safety risks. There are numerous objects, such as electrical components, on Oil/Gas assets that operate in hazardous areas. These are often safety critical and need to comply with regulatory and corporate standards.

Hazardous areas are typically areas where flammable liquids, vapours, gases or combustible dusts are likely to occur in quantities sufficient to cause a hazard risk, such as of fire or explosion. Hazardous environments or areas are sometimes referred to as "Ex Locations", "Zoned Areas", "Explosive Atmospheres" or "ATEX Areas". Consequently, equipment that is certified for use in these areas is often called "ATEX Equipment", "HAE" or "Ex Equipment". Equipment can have various terms or ratings, such as "Ex d" (Flameproof), "Ex e" (Increased Safety), "Ex I" (Intrinsic Safety) and "Ex p" (Pressurised).

International requirements and guidelines for general and detailed inspections, such as an ATEX Directive (e.g. 2014/34/EU) in the EU (or equivalent harmonised international IECEx standards), can include detailed inspections of components such as junction boxes, connectors, lighting systems and glands. Often, large numbers of components or equipment are involved, with some assets or facilities having tens of thousands or more objects in hazardous areas. Accordingly, inspection can be an onerous requirement. The detailed inspections require isolating the systems and opening up the component for inspection and reassembly. During the operating life cycle of the asset, inspections can be difficult because of the location of the components, which often necessitates staging or rope access COMPEX certified electrical inspectors to carry out the inspections. Inspections can reveal faults or defects in the components that may have been present since manufacture or assembly.

It may be an object of one or more aspects, examples, embodiments, or claims of the present disclosure to at least mitigate or ameliorate one or more problems associated with the prior art.

SUMMARY

According to an aspect of the invention, there is provided a method of inspecting an object. The object may be for, in or from a hazardous environment or area. The object may comprise hazardous area apparatus or equipment, or at least a component thereof. The method may comprise a non-invasive inspection. The method may comprise the inspection of an electrical and/or electronic component/s or system/s. The method may comprise obtaining a radiographic result, such as a radiographic image, of the object. The method may comprise inspection without isolating the object, such as without electrically isolating the object. The method may comprise inspection without dismantling or disassembling the object, or component/s thereof.

It may be an advantage of the present invention, that method allows an effective management of the HAE, particularly given, for example, the number of items of equipment potentially involved, their accessibility, the varying risks they represent or a lack of prior or existing information on asset registers or current condition.

The method may comprise a radiographic inspection of the object. The radiographic inspection may comprise a radiographic scan. The method may comprise a radiographic inspection using a portable radiographic imaging apparatus. The portable radiographic imaging apparatus may comprise a handheld apparatus. The method may comprise transporting the portable radiographic imaging apparatus into the hazardous area. The method may comprise positioning the portable radiographic imaging apparatus in the hazardous area, in particular relative to the object to be inspected. The method may comprise fixing the radiographic imaging apparatus relative to the object to be inspected, particularly temporarily fixing the portable radiographic imaging apparatus. The method may comprise a digital radiographic inspection, the radiographic imaging apparatus being a digital radiographic imaging apparatus.

The method may comprise analysing a radiographic result of the radiographic inspection. The radiographic result may comprise a radiographic image or a simulation or visual representation based upon the radiographic inspection. The method may comprise post-inspection analysis. The method may comprise obtaining the radiographic result/s of the object/s and subsequently analysing the radiographic image/s or the simulation or visual representation. The method may comprise storing the inspection data, such as storing the radiographic result/s of the object/s. The method may comprise analysing for a fault/s or defect/s in the object. The fault/s or defect/s may comprise an existing fault/s or defect/s and/or future or pending fault/s or defect/s, such as where a future fault or defect may occur, or may be likely to occur.

The method may comprise systematically analysing the radiographic result, such as according to a prescribed or predetermined analysis protocol. The method may comprise automatically analysing the radiographic result. The method may comprise at least partially digitally analysing at least a portion of the radiographic result, such as using image analysis software or the like. Additionally, or alternatively, the method may comprise manually analysing the radiographic result. The method may comprise manual analysis of the radiographic result by an expert, inspector or engineer. The method may comprise the performance of the analysis of the radiographic result by a different person than obtained the radiographic result, such as an expert, inspector or engineer not present in the hazardous area and/or remote thereto. Alternatively, the analysis may be performed by the same person as obtained or obtaining the radiographic result.

The method may comprise a measurement of one or more properties or characteristics of the object. The one or more properties or characteristics may be associated with an electrical property or characteristic of the object and/or another object connected thereto or associated therewith. The one or more properties or characteristics may comprise or at least correspond to a physical or mechanical property of the object, such as geometry or dimension. In at least some examples, the one or more properties or characteristics may comprise a connection, such as an electrical and/or mechanical connection of or in the object.

The method may comprise a comparison of the radiographic result/s. For example, the method may comprise comparing the radiographic result with another radiographic result. The another radiographic result may be of or from the object, such as obtained at a different time and/or from a different viewpoint or angle. For example, the method may comprise comparing radiographic results of the same object taken during different inspections, such as different inspections separated by a significant period of time. Accordingly, the method may comprise comparing the radiographic results from at least two inspections, such as to identify or be able to identify a development or a progression of a defect or fault between the two or more inspections. Additionally or alternatively, the method may comprise comparing a plurality of radiographic results of the object obtained during a single inspection. For example, the method may comprise comparing at least two radiographic results of the object from two discrete viewpoints, such as obtained from a radiographic inspection performed from at transverse angles (e.g. perpendicular) and/or opposite angles (e.g. from either side, such as front and back, of the object).

The method may comprise inspecting the object in the hazardous area, such as radiographically inspecting the object whilst the object is in the hazardous area.

Additionally, or alternatively, the method may comprise inspecting the object outside the hazardous area. For example, the method may comprise inspecting the object prior to installing or locating the object in the hazardous area. In at least some examples, the method may comprise inspecting the object during production or manufacture of the object or an associated system incorporating the object; and/or during and/or after installation of the object or the associated system incorporating the object. For example, the method may comprise inspecting the object during manufacture or assembly of the object prior to transfer to the hazardous area and also during and/or after installation of the object in the hazardous area.

Additionally, or alternatively, the method may comprise inspecting the object after removal from the hazardous area. For example, the method may comprise inspecting the object after completion of an operational life cycle and/or between deployments. The method may comprise inspecting the object during the operational life cycle, such as periodically or intermittently between deployment and termination of use. Additionally, or alternatively, the method may comprise inspecting the object upon completion of termination of use. For example, the method may comprise inspecting the object to identify retrospectively whether any faults or defects had been present; and/or whether any faults or defects were likely to occur if use of the object had been continued beyond its termination or removal.

The method may comprise inspecting the object multiple times. The multiple times may be during a single inspection, such as separated by seconds or minutes; and/or during separate discrete inspections, such as separated by weeks, months and/or years. The method may comprise compiling data from multiple inspections. The method may comprise compiling data from multiple inspections of a single object. The method may comprise compiling data from multiple inspection of the single object over a lifespan, or period thereof, of the single object.

The method may comprise inspecting multiple objects. The method may comprise inspecting multiple objects during a single inspection. The single inspection may comprise multiple radiographic scans.

The method may comprise the transmission and detection of electromagnetic radiation to obtain the radiographic result/s. The electromagnetic radiation may comprise X-rays and/or gamma rays. The method may comprise an industrial radiography inspection. The method may comprise using a wavelength configured or suited for the target object and/or associated objects, such as a housing or component around or adjacent the target object. The method may comprise the obtainment of radiographic results using a plurality of wavelengths.

The method may comprise storing the radiographic results and/or analysis/es or data derived therefrom, such as storing in a database. The method may comprise compiling the radiographic results and/or analysis/es or data derived therefrom. The method may comprise compiling the radiographic results and/or analysis/es or data over a period of time for a single object. Additionally, or alternatively, method may comprise compiling the radiographic results and/or analysis/es or data for multiple objects.

The method may comprise analysing the compiled radiographic results and/or analysis/es or data. The analysis may comprise a statistical analysis. The analysis may comprise a risk or risk factor analysis, such as a Failure Modes and Effects Analysis (FMEA) or the like. The method may comprise performing a targeted inspection. The method may comprise performing a targeted inspection in dependence on the compiled radiographic results and/or analysis/es or data. The method may comprise performing a targeted inspection in dependence on a most likely and/or most critical failure location/s and/or object/s and/or feature/s.

The method may comprise compiling an inventory of objects, and/or radiographic results and/or analysis/es or data associated therewith, such as in a database. The method may comprise grading the objects, such as by criticality—typically in dependence on the radiographic results and/or analysis/es or data.

The method may comprise performing a detailed inspection, such as to disassemble the object, and/or other object/s associated therewith, such as to access a portion of the object (e.g. for visual inspection or the like). The method may comprise performing the detailed inspection, such as with disassembly, in dependence on the radiographic inspection. The method may comprise performing the detailed inspection subsequent to the radiographic inspection. The method may comprise performing the detailed inspection of only targeted object/s and/or location/s and/or feature/s in dependence on the radiographic inspection and/or on the radiographic results and/or analysis/es or data derived therefrom. In at least some examples, the method may comprise replacing a detailed inspection, such as with disassembly, or a planned detailed inspection with the radiographic inspection. The method may comprise determining and/or following an inspection programme. The method may comprise identifying which object/s require or are likely to require inspection. The method may comprise identifying or determining a detailed procedure for the inspection of each object. The detailed procedure may be determined in dependence on a probable defect or failure type/s; and may comprise an associated, preferably validated, method for detecting such defects or failures. The detailed procedure may be determined in dependence on the analysis, such as an FMEA.

The steps of the method may be in any order. The method of inspecting the object may be referred to as a method of inspection.

It may be an advantage of the present invention that the method of inspection is equivalent or at least substantially equivalent, such as in quality and/or scope, to the inspection that a competent person would achieve with a conventional inspection, such as a prescribed or certified inspection or detailed inspection. It may be an advantage of the present invention that the method of inspecting the object is in a manner and/or quality and/or resolution at least equivalent to that required by regulation. The manner and/or quality and/or resolution may be at least equivalent to that obtainable by conventional inspection or general inspection, or at least comparable thereto. The manner and/or quality and/or resolution may be at least equivalent to that obtainable by visual inspection, or at least comparable thereto. The manner and/or quality and/or resolution may be at least equivalent to that obtainable by electrical testing. It may be an advantage of the present invention that the method of inspecting the object is in a manner and/or quality and/or resolution at least equivalent to that which a skilled surveyor or engineer would achieve if they had access to the object, such as with dismantling or disassembly, and optionally isolation, of the object.

According to an aspect of this invention, there is provided an apparatus configured to perform a method according to an aspect, claim, embodiment or example of this disclosure.

According to an aspect of the invention, there is provided a controller arranged to perform a method according to an aspect, claim, embodiment or example of this disclosure.

According to an aspect of the invention, there is provided a system comprising a controller according to an aspect, claim, embodiment or example of this disclosure, or a system arranged to perform a method according to an aspect, claim, embodiment or example of this disclosure.

According to an aspect of the invention, there is provided computer software which, when executed by a processing means, is arranged to perform a method according to any aspect, claim, embodiment or example of this disclosure. The computer software may be stored on a computer readable medium. The computer software may be tangibly stored on a computer readable medium. The computer readable medium may be non-transitory.

Any controller or controllers described herein may suitably comprise a control unit or computational device having one or more electronic processors. Thus, the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this disclosure it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION

An embodiment of the invention will now be described by way of example only, and with reference to the accompanying drawings, in which.

DETAILED DESCRIPTION

Figure 1:
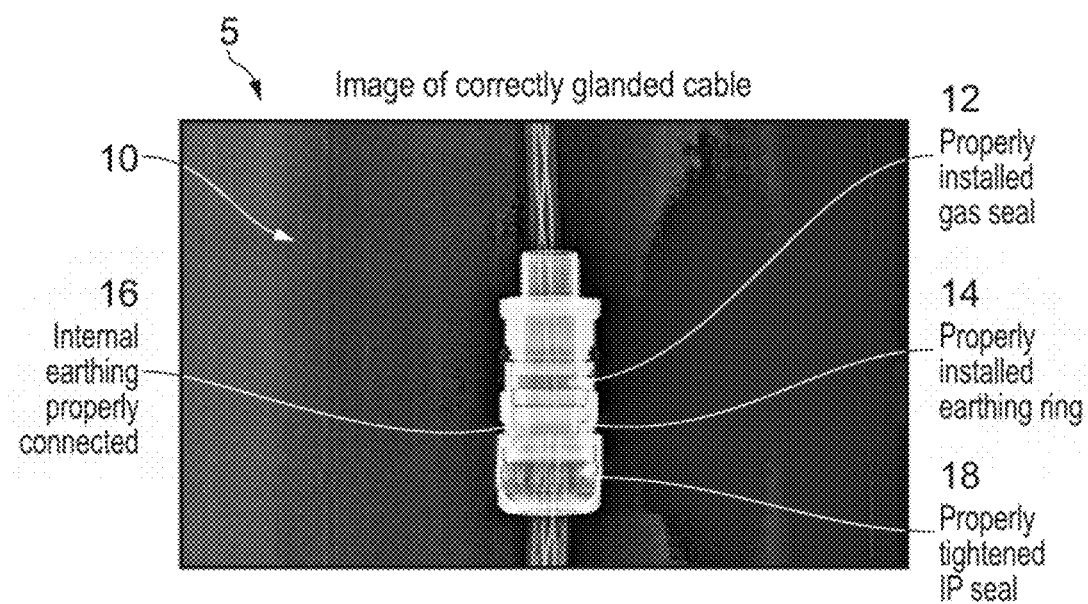
FIG. 1 shows a first example inspection image of a first object.

There is herein described a method 2 of inspecting an object 10. The object 10 is for a hazardous environment or area. The object 10 shown in FIG. 1 comprises hazardous area apparatus or equipment. Here, the method comprises the non-invasive inspection 8 of an electrical and/or electronic component's or system/s. The method comprises obtaining a radiographic result, shown in FIG. 1 as a digital radiographic image 5, of the object 10. The method here comprises inspection without isolating the object 10, such as without electrically isolating, the object. The method comprises inspection without dismantling or disassembling 4 the object 10, or components thereof.

Figure 2:
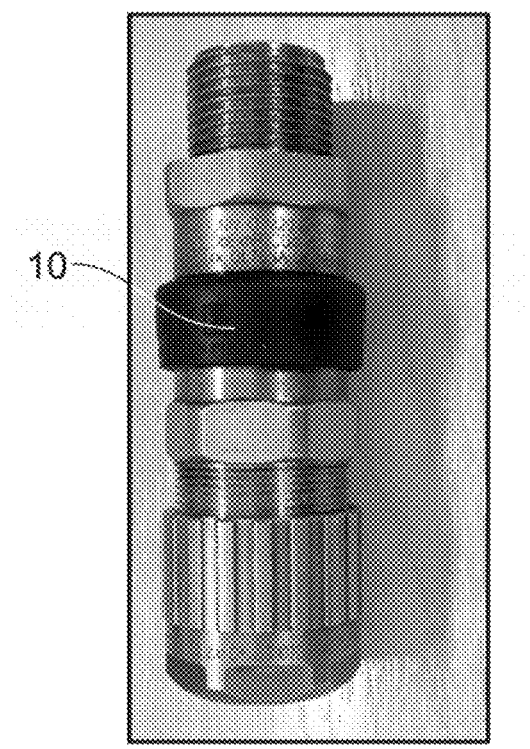
FIG. 2 shows a photo of the first object in a different configuration.

The object 10 shown in FIG. 1 is a correctly installed cable gland, which is shown in the photograph of FIG. 2 (cable not shown). The radiography image 5 of the object 10 shows in detail the internal configuration of the joint; the properly installed gas seal 12, the earthing ring, the internal earthing 16, and the IP seal 18 at the end of the gland.

Following the radiography of the correctly made connection, the object 10 was visually inspected to confirm analysis of the radiography, as shown in FIG. 2.

It is an advantage of the present invention, that method allows an effective management of the HAE, particularly given, for example, the number of items of equipment potentially involved, their accessibility, the varying risks they represent or a lack of prior or existing information on asset registers or current condition.

The method comprises a radiographic inspection of the object 10, such as a radiographic scan. The method comprises a radiographic inspection using a portable radiographic imaging apparatus 7. The portable radiographic imaging apparatus 7 comprises a handheld digital radiographic imaging apparatus. The method comprises transporting 6 the portable radiographic imaging apparatus into the hazardous area 9; positioning the portable radiographic imaging apparatus in the hazardous area 9 relative to the object to be inspected. The method comprises temporarily fixing the radiographic imaging apparatus relative to the objective to be inspected.

The method comprises analysing the radiographic result of the radiographic inspection. The radiographic result comprises the radiographic image 5. Here, the method comprises post-inspection analysis: obtaining the radiographic result of the object 10 and subsequently analysing the radiographic image 5. The method comprises storing the inspection data, such as storing the radiographic result 5 of the object 10. The method comprises analysing for faults or defects in the object 10. The faults or defects comprise existing faults or defects and also future or pending faults or defects, such as where a future fault or defect may occur, or may be likely to occur.

The method comprises systematically analysing the radiographic result 5, such as according to a prescribed or predetermined analysis protocol. In some examples, the method comprises automatically analysing the radiographic result 5. The method comprises at least partially digitally analysing at least a portion of the radiographic result 5, such as using image analysis software or the like. Here, the method comprises manually analysing the radiographic result 5. The method here comprises manual analysis of the radiographic result 5 by an expert, inspector or engineer.

Figure 3:
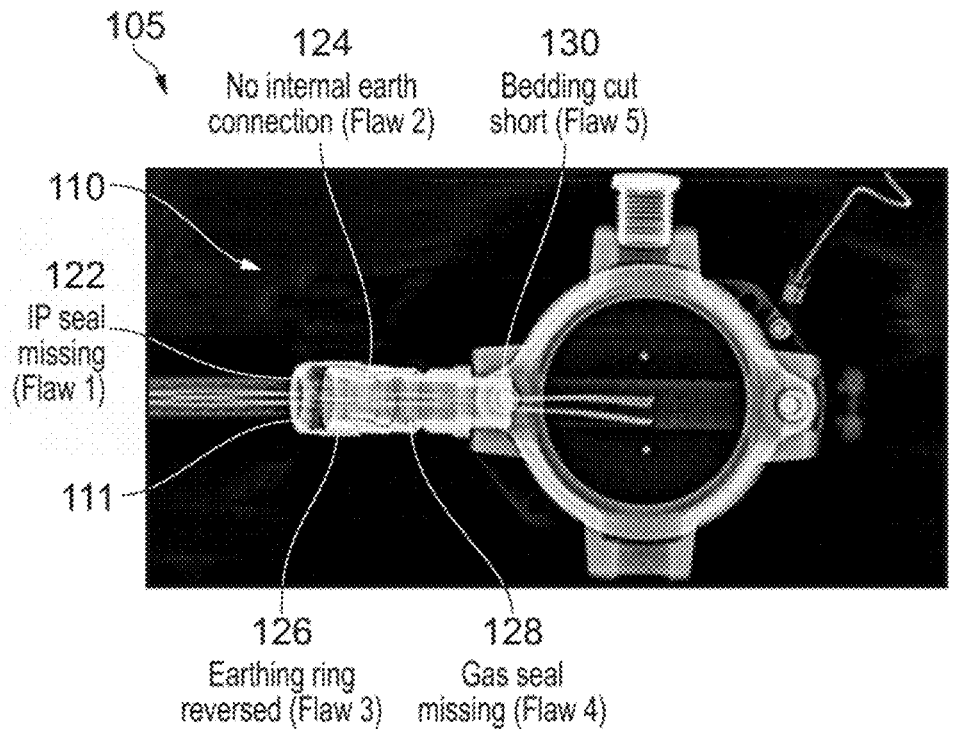
FIG. 3 shows another example inspection image of another object in plan view.

Reference is now made to FIG. 3 and associated FIGS. 4 through 9. FIG. 3 shows another example inspection image of another object 110 in plan view, the object 110 here being a junction box, incorporating a gland 111 similar to that 10 shown in FIGS. 1 and 2. As can be seen from the respective digital radiographic images of FIGS. 3, 4 and 5, a number of faults or defects can be determined from the radiographic images 105, 115, 125.

Figure 4:
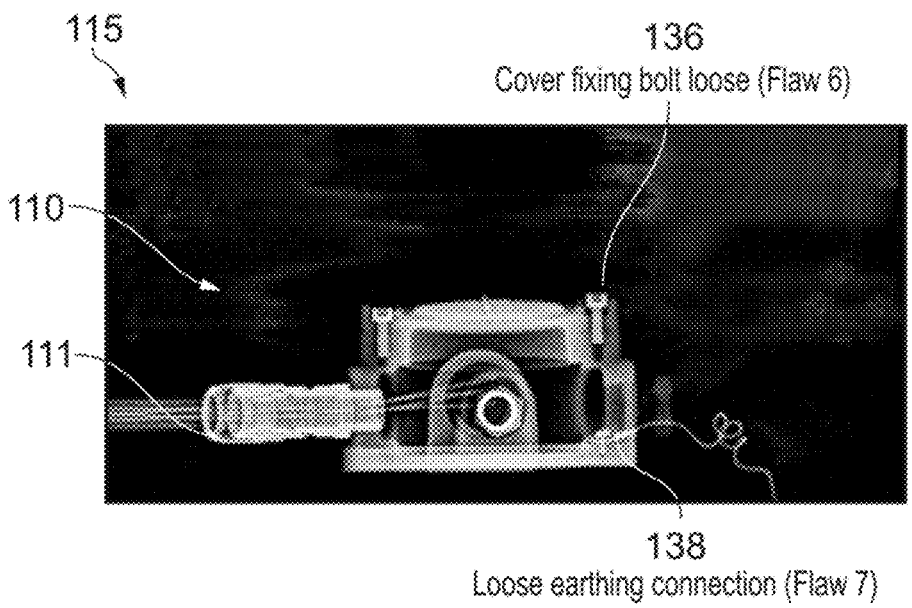
FIG. 4 shows another example inspection image of the object of FIG. 3 in a first side view.
Figure 5:
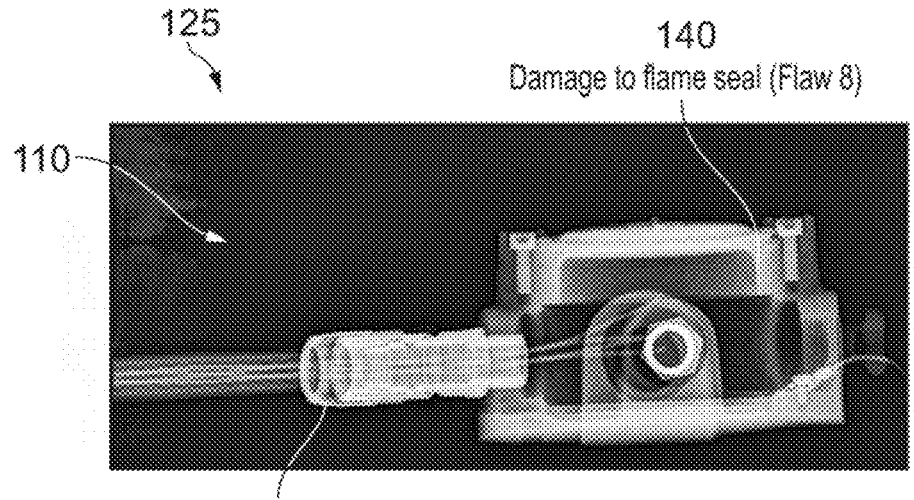
FIG. 5 shows another example inspection image of the object of FIG. 3 in a second side view.
Figure 6:
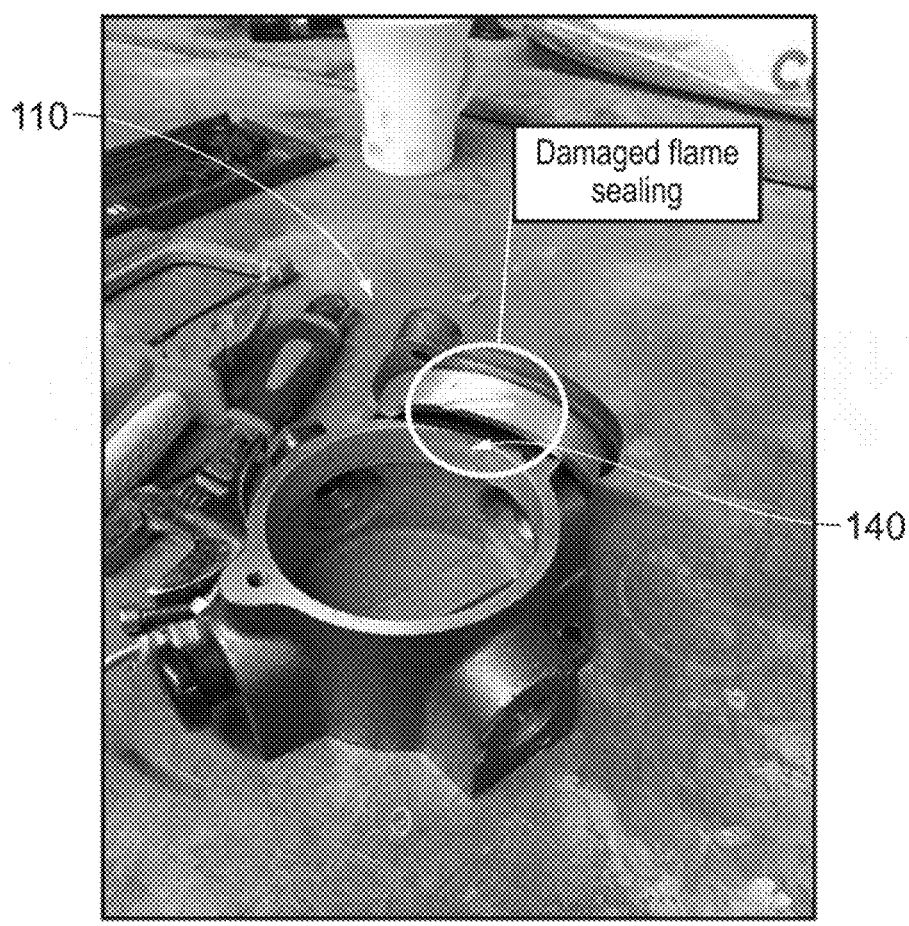
FIG. 6 shows a photo of the object of FIG. 3 in a first configuration.
Figure 7:
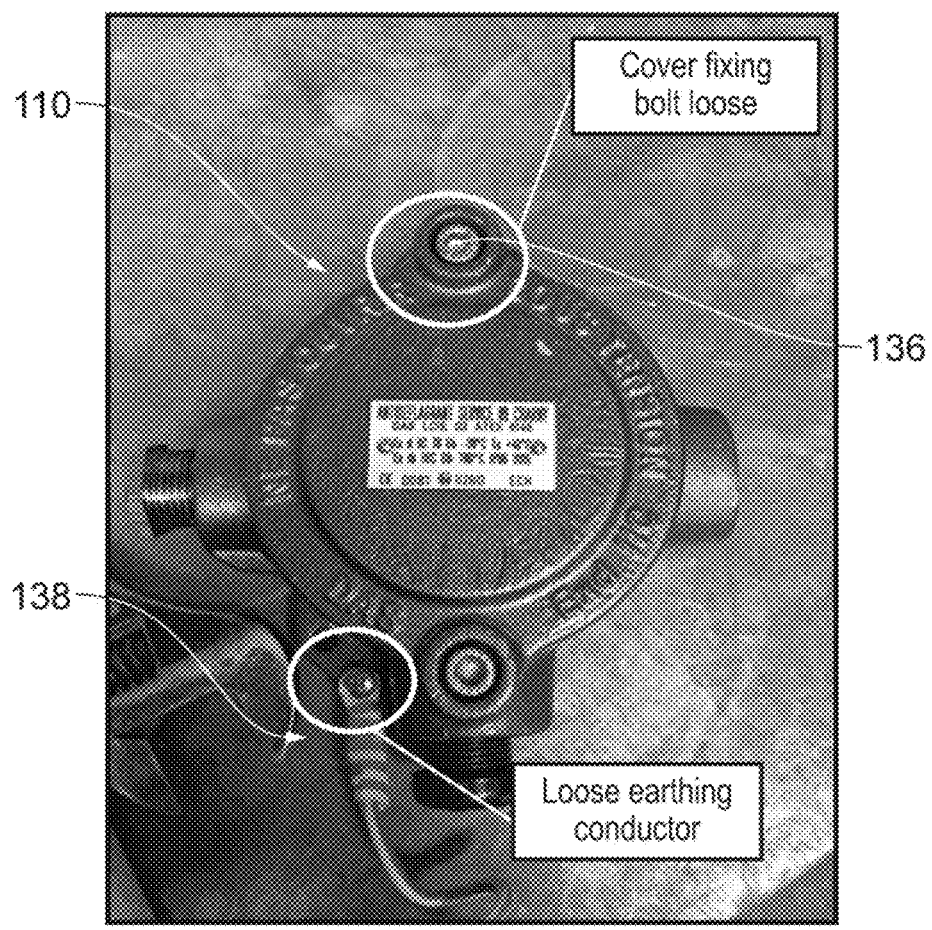
FIG. 7 shows a photo of the object of FIG. 3 in a second configuration.
Figure 8:
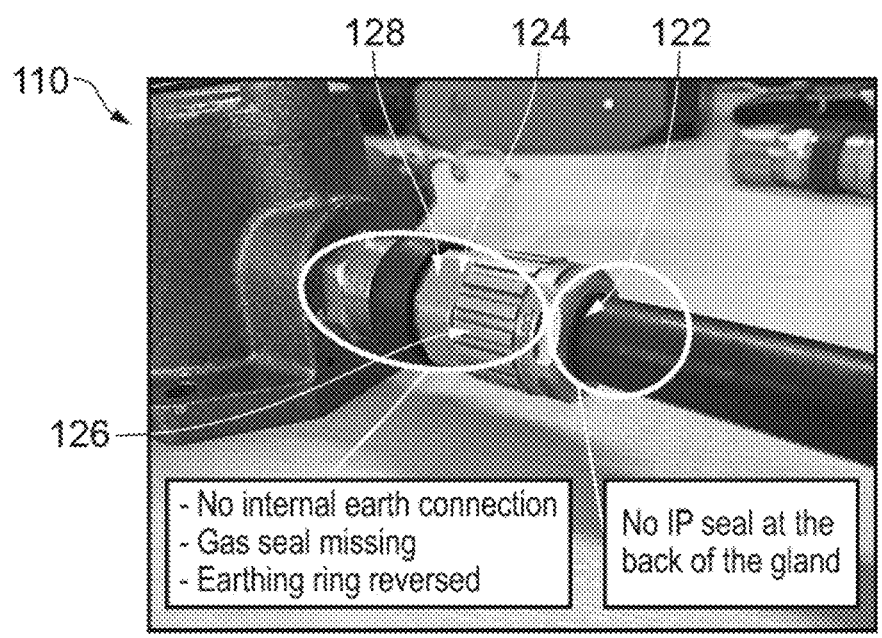
FIG. 8 shows a photo of the object of FIG. 3 in a third configuration.
Figure 9:
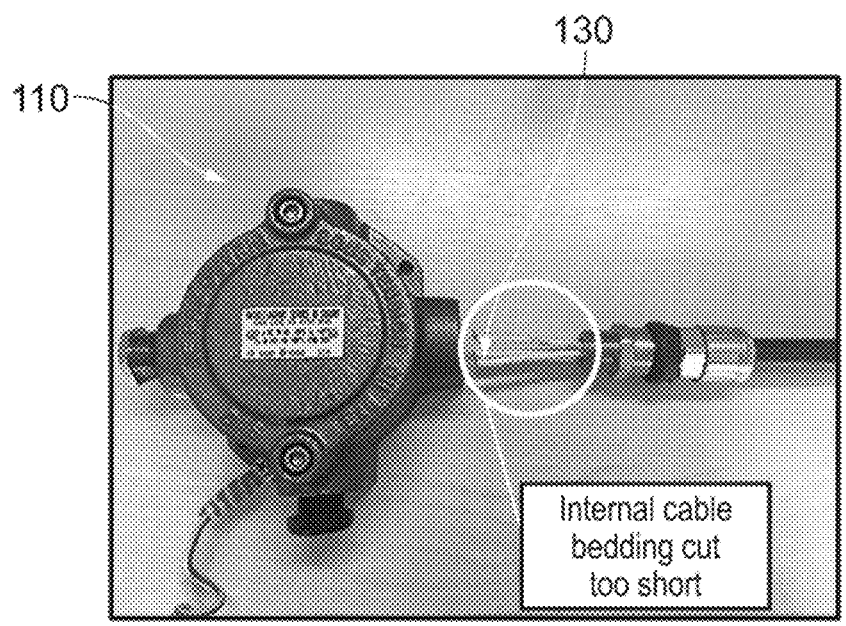
FIG. 9 shows a photo of the object of FIG. 3 in a fourth configuration.

The defects determined are summarised in table 1 below, with reference numbers indicating the features shown in the respective radiographic images 105, 115, 125 of FIGS. 3, 4 and 5:

| Object 110: Ex d IIC T6 Gb junction box with glanded cable connected | |
|---|---|
| Ref No | Flaw description |
| 122 | No IP seal at the back of the gland 111 |
| 124 | No internal earth connection |
| 126 | Earthing ring reversed |
| 128 | Gas seal missing |
| 130 | Internal cable bedding cut too short |
| 136 | Cover fixing bolt loose |

| Object 110: Ex d IIC T6 Gb junction box with glanded cable connected | |
|---|---|
| Ref No | Flaw description |
| 138 | Loose earthing conductor |
| 140 | Damaged flame sealing |

FIGS. 6 to 9 show corresponding photos visually showing the defects identified above, with corresponding reference numerals indicating the corresponding defects. As can be seen from FIG. 6 in particular, disassembly of the object 110 has been required to visually identify the defect 140 of the damaged flame sealing that was non-invasively identified from the radiographic image 125 of FIG. 5.

The method here comprises a measurement of one or more properties or characteristics of the object. In at least some of these examples, the properties or characteristics are associated with an electrical property or characteristic of the object 110 and/or another object connected thereto or associated therewith. In addition, here the properties or characteristics comprise physical or mechanical properties of the object 110, such as geometry or dimension. In at least some examples, the properties or characteristics comprises a connection, such as the omission of the internal earth connection 124 in the object 110.

It will be appreciated that the method comprises a comparison of the radiographic results 105, 115, 125. For example, here the method comprises comparing the radiographic results 105, 115, 125 of the object 110, obtained at a similar time from a different viewpoint or angle in each of FIGS. 3, 4 and 5 during a single inspection. The respective viewpoints are at transverse angles (e.g. perpendicular) and/or opposite angles (e.g. from either side, such as front and back, of the object), as can be seen. It will also be appreciated, that the method comprises comparing the radiographic results 105, 115, 125 from at least two inspections over a period of time (not shown) to identify or be able to identify a development or a progression of a defect or fault between the two or more inspections.

The method comprises radiographically inspecting the object 110 whilst the object is in the hazardous area.

Figure 10:
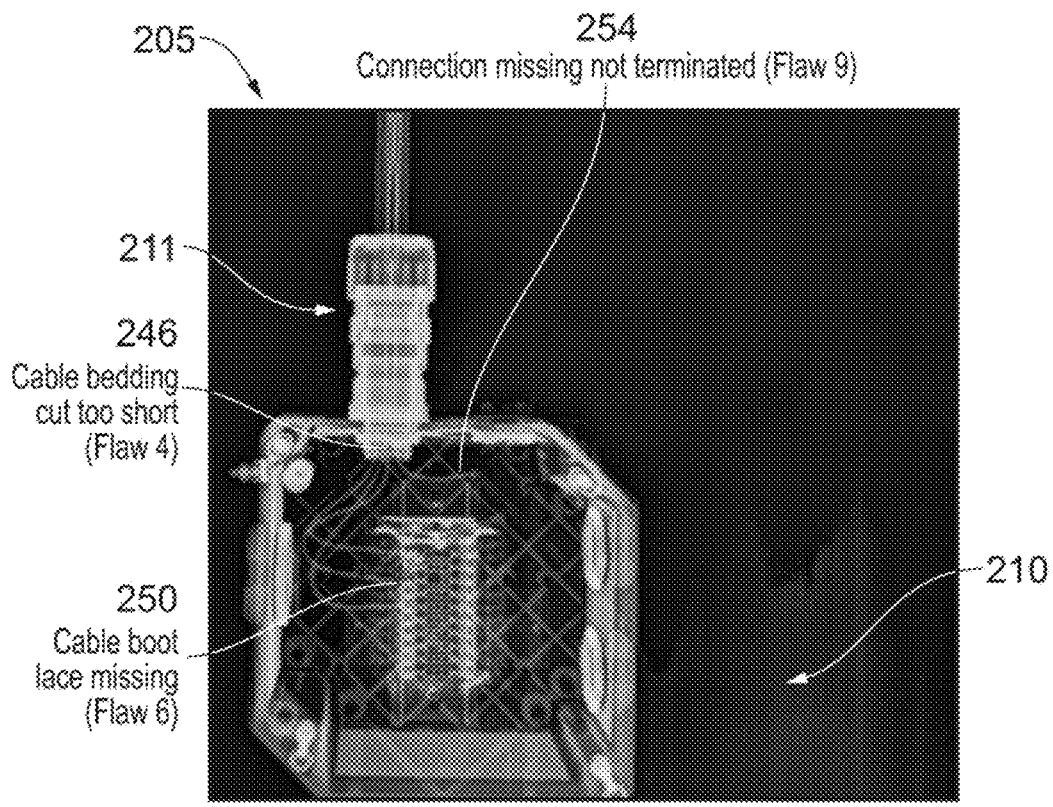
FIG. 10 shows another example inspection image of another object in plan view.
Figure 11:
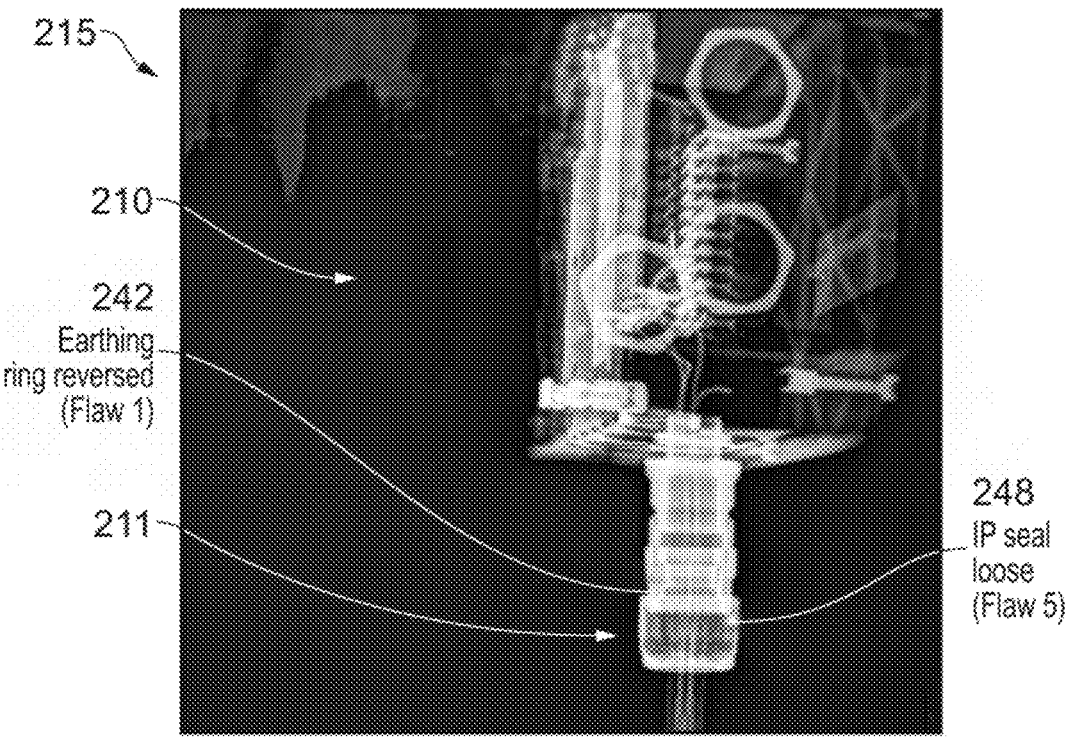
FIG. 11 shows another example inspection image of the object of FIG. 10 in a first side view.
Figure 12:
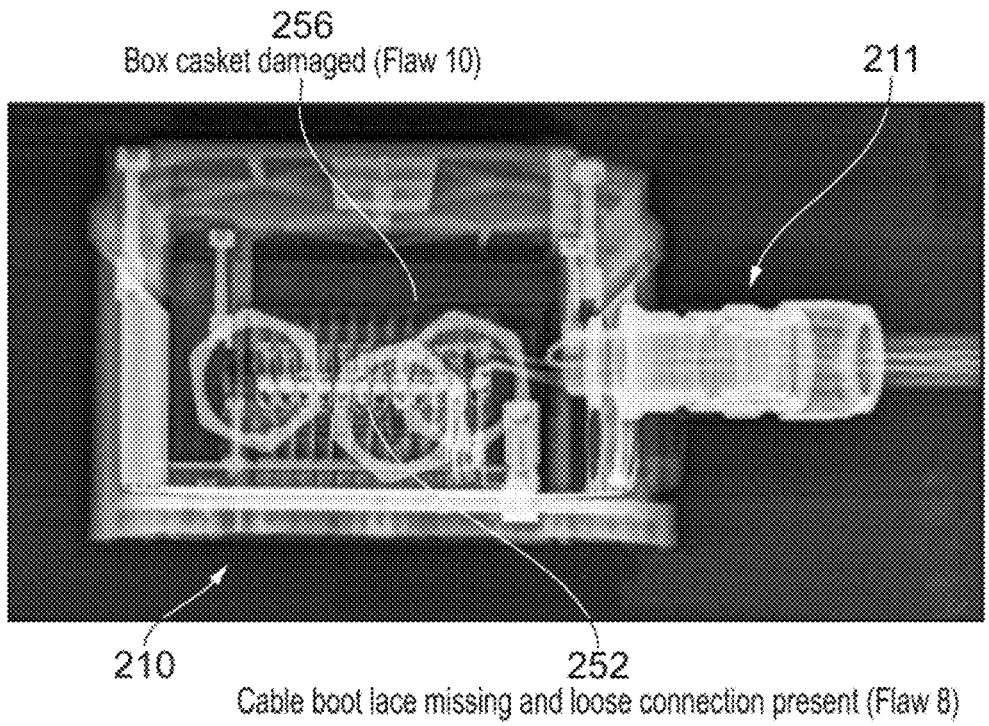
FIG. 12 shows another example inspection image of the object of FIG. 10 in a second side view.

Reference is now made to FIG. 10 and associated FIGS. 11 through 15. FIG. 10 shows another example inspection image of another object 210 in plan view, the object 210 here being a junction box, incorporating a gland 211 similar to that 10 shown in FIGS. 1 and 2. As can be seen from the respective digital radiographic images of FIGS. 10, 11 and 12, a number of faults or defects can be determined from the radiographic images 205, 215, 225.

| Object 210: Ex e IIC GB T6 junction box with glanded cable connected | |
|---|---|
| Ref No | Flaw description |
| 242 | Earthing ring reversed |
| 246 | Internal cable bedding cut too short |
| 248 | IP seal loose |
| 250 | Cable boot lace missing |
| 252 | Cable boot lace missing and loose connection present |
| 254 | Connection missing - not terminated |
| 256 | Box gasket loose |

Figure 13:
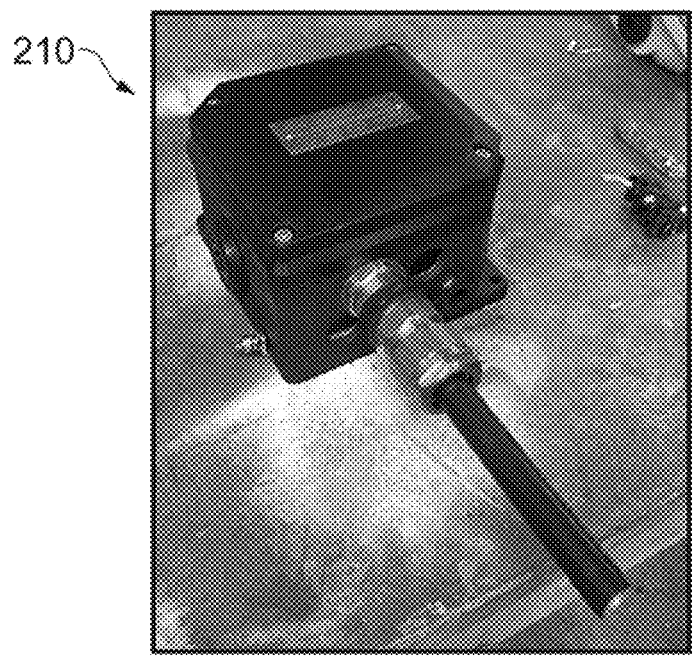
FIG. 13 shows a photo of the object of FIG. 10 in a first configuration.
Figure 14:
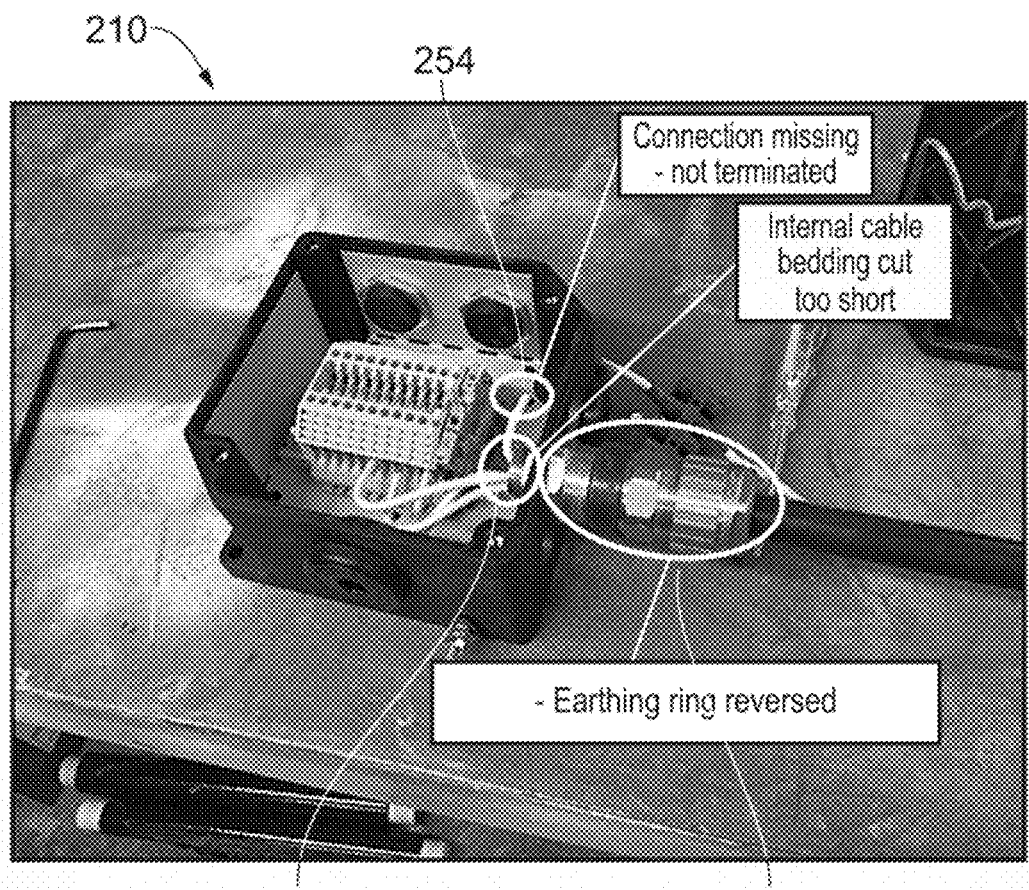
FIG. 14 shows a photo of the object of FIG. 10 in a second configuration.
Figure 15:
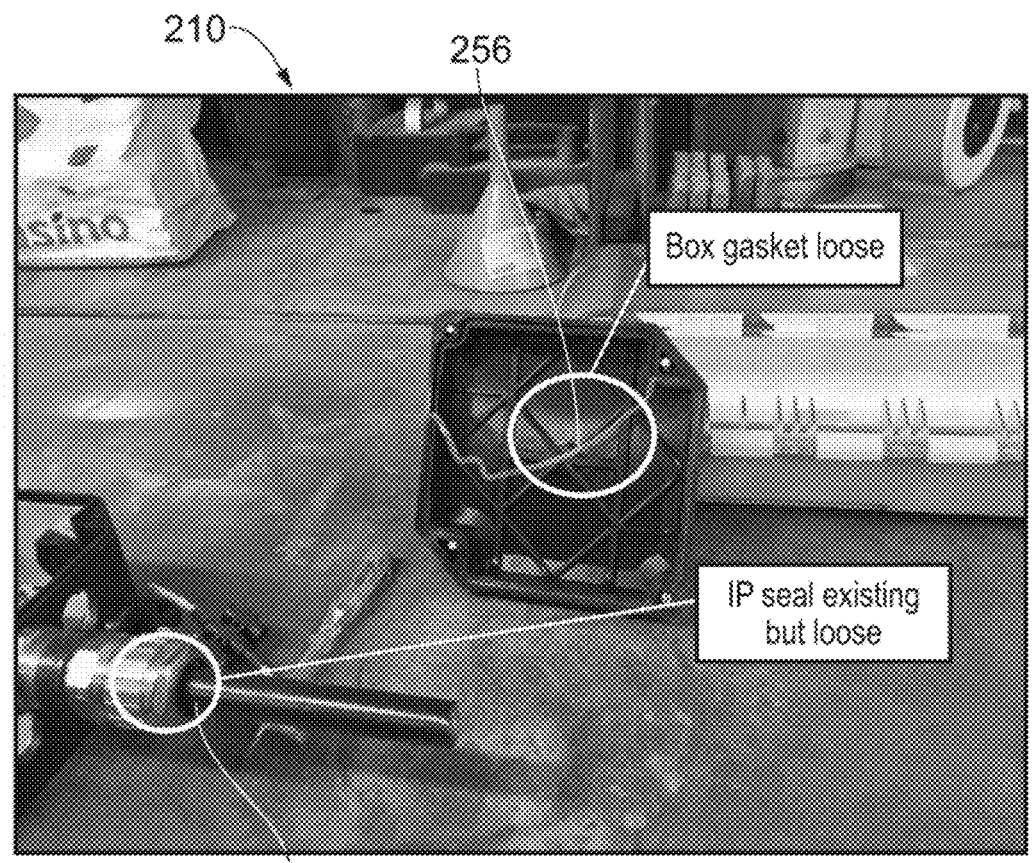
FIG. 15 shows a photo of the object of FIG. 10 in a third configuration.

FIGS. 13 to 15 show corresponding photos visually showing the defects identified above, with corresponding reference numerals indicating the corresponding defects. As can be seen from FIGS. 14 and 15 in particular, disassembly of the object 210 has been required to visually identify the defects, such as the defect 246 of the internal cable bedding cut too short that was non-invasively identified from the radiographic image 205 of FIG. 10. It will be appreciated that the visual inspection indicated in FIGS. 13 to 15 can be performed after the radiographic imaging of FIGS. 10 to 12, such as where the radiographic imaging identifies the apparent defects.

Figure 16:
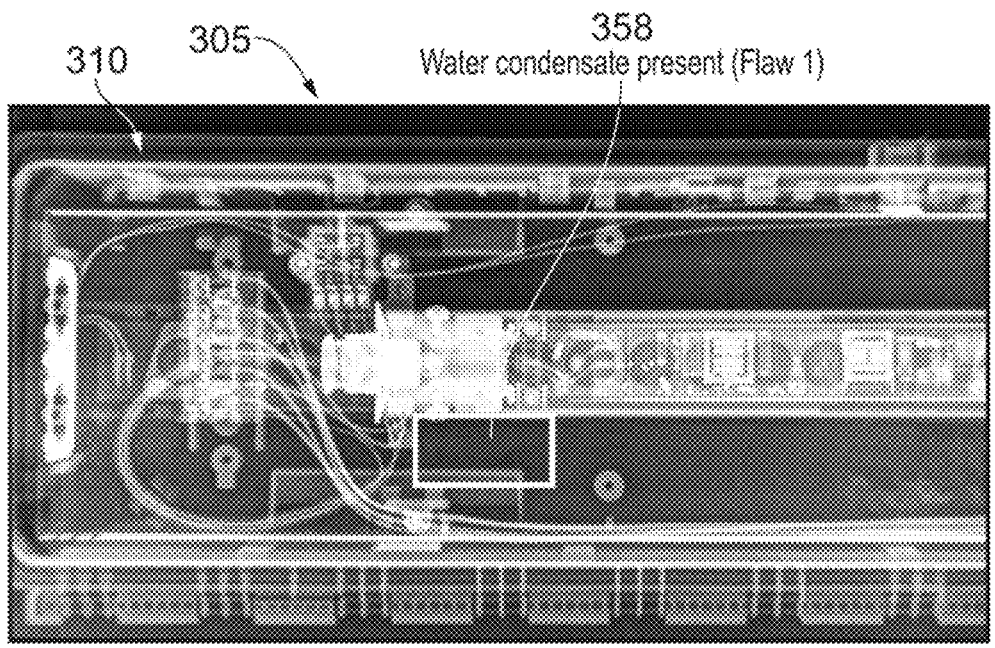
FIG. 16 shows another example inspection image of another object in plan view.
Figure 17:
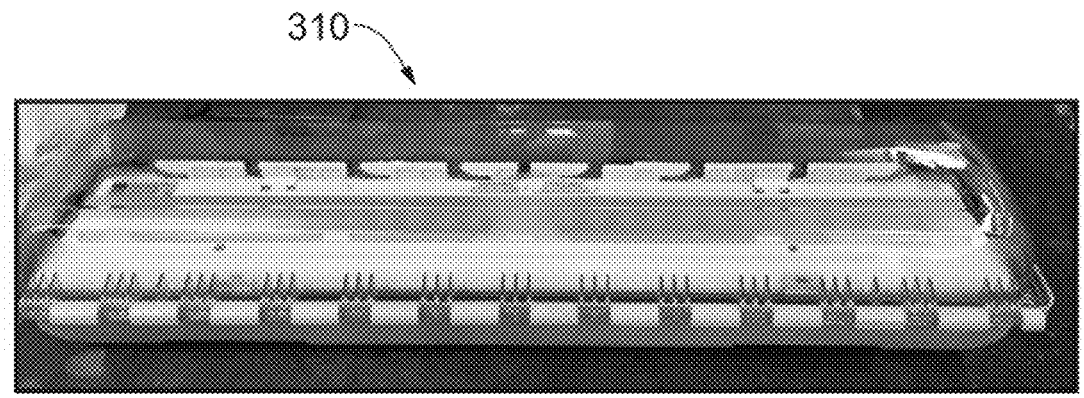
FIG. 17 shows a photo of the object of FIG. 16.
Figure 18:
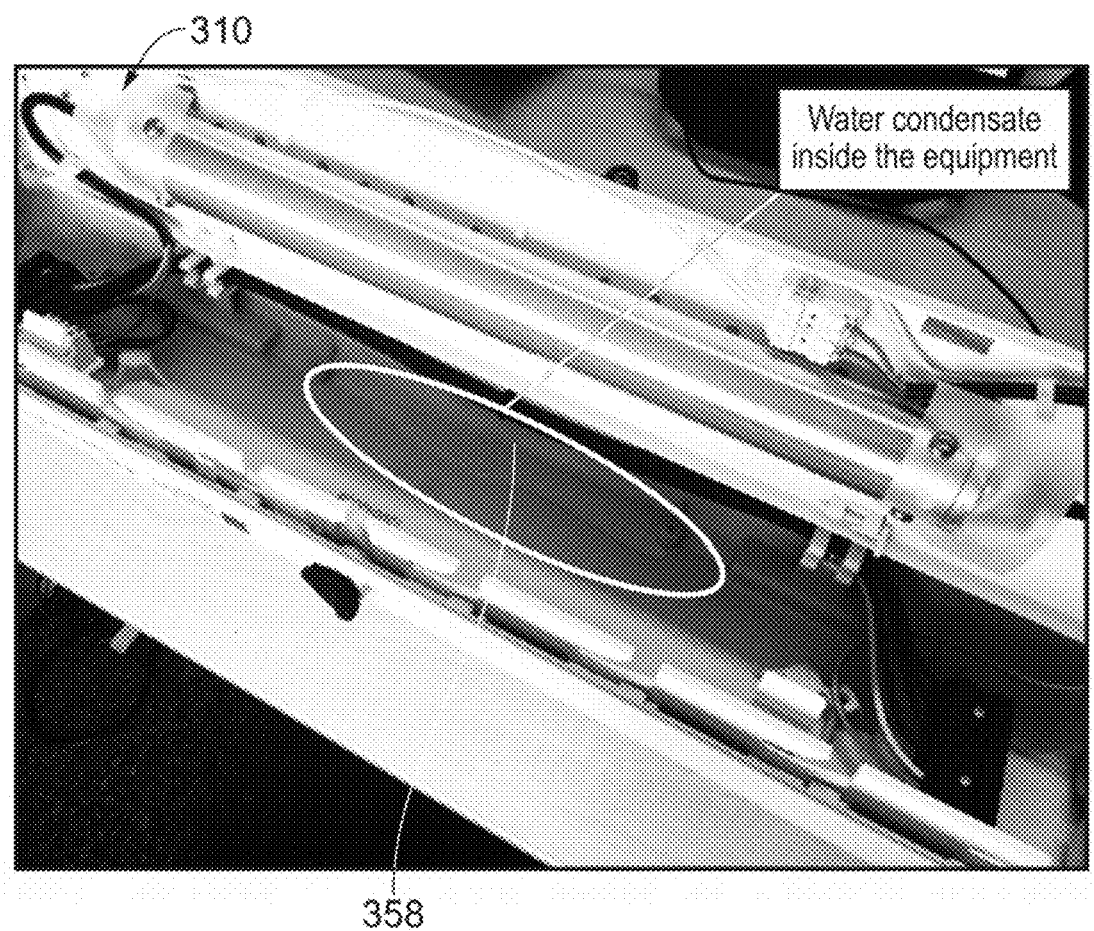
FIG. 18 shows another photo of the object of FIG. 16.
Figure 19:
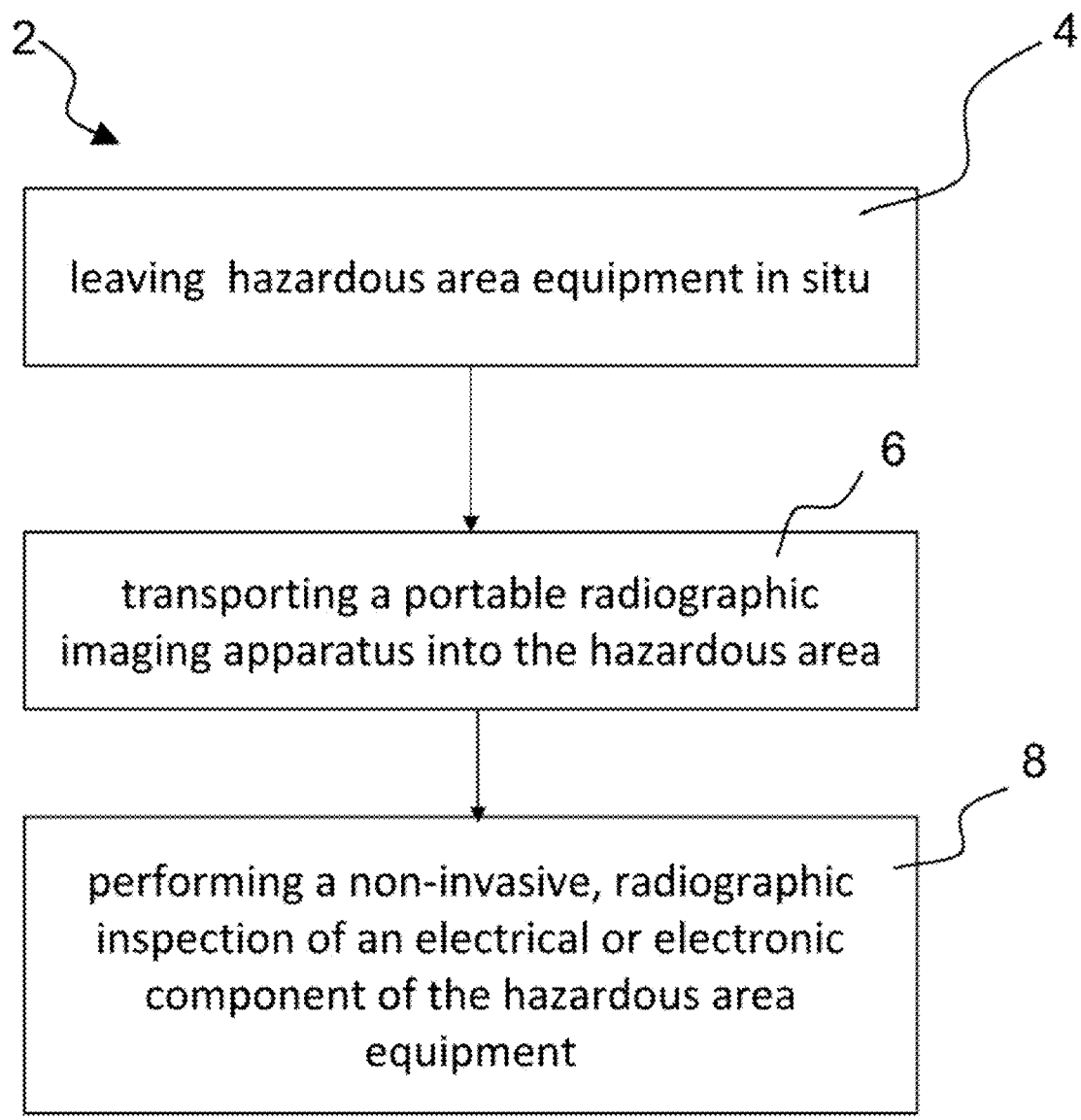
FIG. 19 shows a flow chart of an exemplary process or method in accordance with the instant disclosure.
Figure 20:
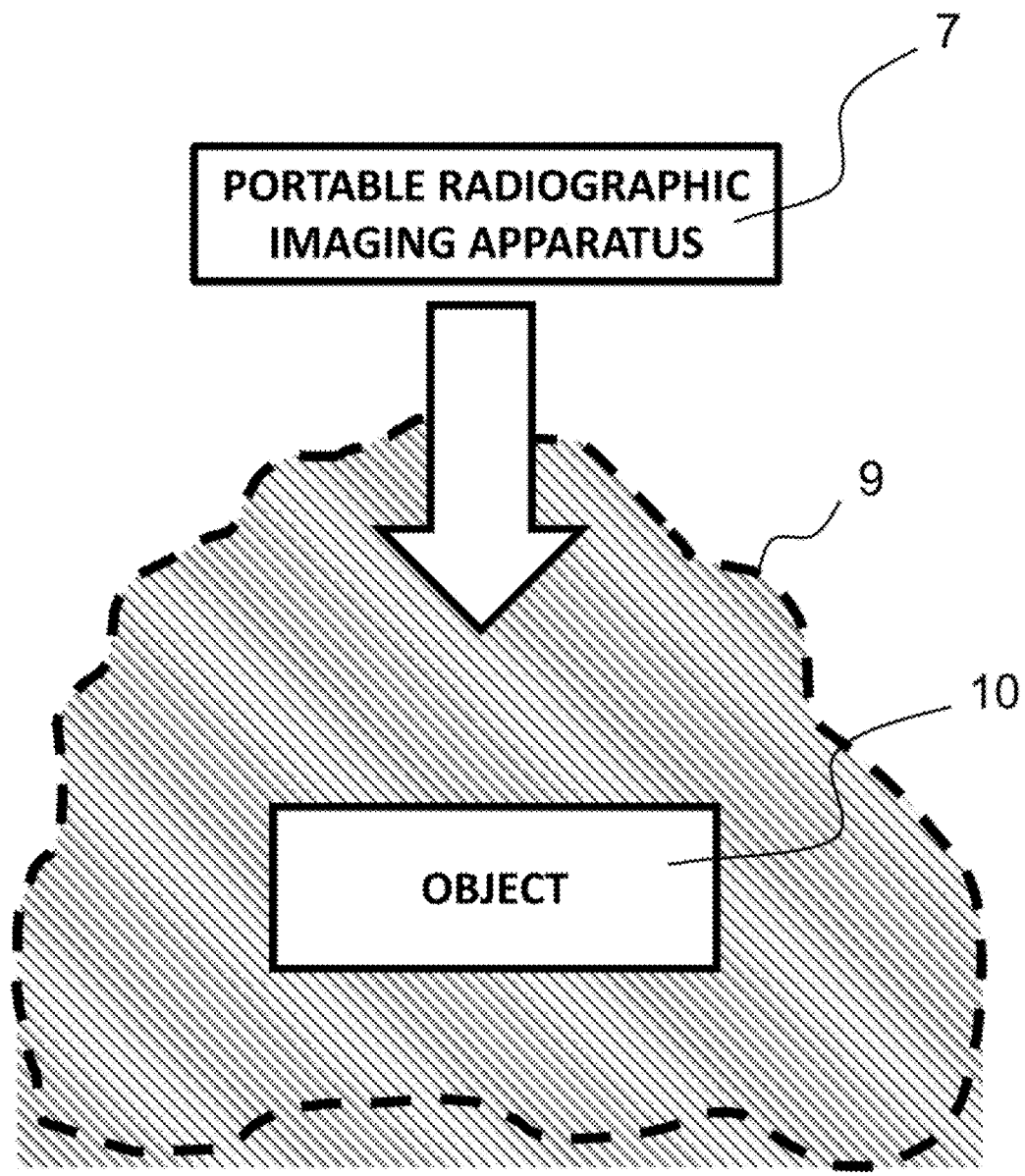
FIG. 20 shows a schematic diagram of a portable radiographic imaging apparatus.

Reference is now made to FIG. 16 and associated FIGS. 17 and 18. FIG. 16 shows another example inspection image of another object 310 in plan view, the object 310 here being an "Ex d e op is IIB T4 Gb light fitting". As can be seen from the digital radiographic image 305 of FIG. 16, a defect 358 can be determined from the radiographic image 305 alone. Here the defect 358 comprises water condensate inside the light fitting 310.

Purely for illustration here, the method comprises inspecting the object 310 outside the hazardous area. For example, the method comprises inspecting the object 310 prior to installing or locating the object 310 in the hazardous area. In at least some examples, the method comprises inspecting the object 310 during production or manufacture of the object 310 or an associated system incorporating the object 310; and/or during and/or after installation of the object 310 or the associated system incorporating the object 310. For example, the method comprises inspecting the object 310 during manufacture or assembly of the object 310 prior to transfer to the hazardous area and also during and/or after installation of the object 310 in the hazardous area.

Additionally, or alternatively, the method comprises inspecting the object 10, 110, 210, 310 after removal from the hazardous area. For example, the method comprises inspecting the object 10, 110, 210, 310 after completion of an operational life cycle and/or between deployments. The method comprises inspecting the object 10, 110, 210, 310 during the operational life cycle, such as periodically or intermittently between deployment and termination of use. Additionally, or alternatively, the method comprises inspecting the object 10, 110, 210, 310 upon completion of termination of use. For example, the method comprises inspecting the object 10, 110, 210, 310 to identify retrospectively whether any faults or defects had been present; and/or whether any faults or defects were likely to occur if use of the object 10, 110, 210, 310 had been continued beyond its termination or removal.

The method comprises inspecting the object 10, 110, 210, 310 multiple times. The multiple times are during a single inspection, such as separated by seconds or minutes; and/or during separate discrete inspections, such as separated by weeks, months and/or years. The method comprises compiling data from multiple inspections. The method comprises compiling data from multiple inspections of a single object 10, 110, 210, 310. The method comprises compiling data from multiple inspection of the single object 10, 110, 210, 310 over a lifespan, or period thereof, of the single object 10, 110, 210, 310.

The method comprises inspecting multiple object 10, 110, 210, 310s. The method comprises inspecting multiple object 10, 110, 210, 310s during a single inspection. The single inspection comprises multiple radiographic scans.

The method comprises the transmission and detection of electromagnetic radiation to obtain the radiographic result/s. The electromagnetic radiation comprises X-rays and/or gamma rays. The method comprises an industrial radiography inspection. The method comprises using a wavelength configured or suited for the target object 10, 110, 210, 310 and/or associated objects, such as a housing or component around or adjacent the target object 10, 110, 210, 310. The method comprises the obtainment of radiographic results using a plurality of wavelengths.

The method comprises storing the radiographic results and/or analysis/es or data derived therefrom, such as storing in a database. The method comprises compiling the radiographic results and/or analysis/es or data derived therefrom. The method comprises compiling the radiographic results and/or analysis/es or data over a period of time for a single object 10, 110, 210, 310. Additionally, or alternatively, the method comprises compiling the radiographic results and/or analysis/es or data for multiple objects.

The method comprises analysing the compiled radiographic results and/or analysis/es or data. The analysis comprises a statistical analysis. The analysis comprises a risk or risk factor analysis, such as a Failure Modes and Effects Analysis (FMEA) or the like. The method comprises performing a targeted inspection. The method comprises performing a targeted inspection in dependence on the compiled radiographic results and/or analysis/es or data. The method comprises performing a targeted inspection in dependence on a most likely and/or most critical failure location/s and/or object/s and/or feature/s.

The method comprises compiling an inventory of objects 10, 110, 210, 310, and/or radiographic results and/or analysis/es or data associated therewith, such as in a database. The method comprises grading the objects 10, 110, 210, 310, such as by criticality—typically in dependence on the radiographic results and/or analysis/es or data.

The method comprises performing a detailed inspection, such as to disassemble the object 10, 110, 210, 310, and/or other object associated therewith, such as to access a portion of the object 10, 110, 210, 310 (e.g. for visual inspection or the like). The method comprises performing the detailed inspection, such as with disassembly, in dependence on the radiographic inspection. The method comprises performing the detailed inspection subsequent to the radiographic inspection. The method comprises performing the detailed inspection of only targeted object/s 10, 110, 210, 310 and/or location/s and/or feature/s in dependence on the radiographic inspection and/or on the radiographic results and/or analysis/es or data derived therefrom. In at least some examples, the method comprises replacing a detailed inspection, such as with disassembly, or a planned detailed inspection with the radiographic inspection. The method comprises determining and/or following an inspection programme. The method comprises identifying which object/s 10, 110, 210, 310 require or are likely to require inspection. The method comprises identifying or determining a detailed procedure for the inspection of each object 10, 110, 210, 310. The detailed procedure may be determined in dependence on a probable defect or failure type/s; and comprises an associated, preferably validated, method for detecting such defects or failures. The detailed procedure may be determined in dependence on the analysis, such as an FMEA.

The steps of the method may be in any order. The method of inspecting the object 10, 110, 210, 310 may be referred to as a method of inspection.

It may be an advantage of the present invention that the method of inspection is equivalent or at least substantially equivalent, such as in quality and/or scope, to the inspection that a competent person would achieve with a conventional inspection, such as a prescribed or certified inspection or detailed inspection. It may be an advantage of the present invention that the method of inspecting the object 10, 110, 210, 310 is in a manner and/or quality and/or resolution at least equivalent to that required by regulation. The manner and/or quality and/or resolution may be at least equivalent to that obtainable by conventional inspection or general inspection, or at least comparable thereto. The manner and/or quality and/or resolution may be at least equivalent to that obtainable by visual inspection, or at least comparable thereto. The manner and/or quality and/or resolution may be at least equivalent to that obtainable by electrical testing. It may be an advantage of the present invention that the method of inspecting the object 10, 110, 210, 310 is in a manner and/or quality and/or resolution at least equivalent to that which a skilled surveyor or engineer would achieve if they had access to the object 10, 110, 210, 310, such as with dismantling or disassembly, and optionally isolation, of the object 10, 110, 210, 310.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as disclosed in any aspect, example, claim or embodiment of this disclosure, and a machine-readable storage storing such a program. Still further, embodiments of the present disclosure may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of inspecting hazardous area equipment on an oil/gas asset, the method comprising:
    leaving the hazardous area equipment in situ without electrically isolating the hazardous area equipment and without dismantling or disassembling the hazardous area equipment;
    transporting a portable radiographic imaging apparatus into the hazardous area on the oil/gas asset;
    performing a non-invasive, radiographic inspection of an electrical or electronic component of the oil/gas asset's hazardous area equipment using the portable radiographic imaging apparatus;
    wherein the hazardous area equipment remains in situ on the oil/gas asset without being electrically isolated and without being disassembled throughout the non-invasive, radiographic inspection.

2. The method according to claim 1, wherein the method comprises temporarily fixing the portable radiographic imaging apparatus relative to the equipment to be inspected.

3. The method according to claim 1, wherein the method comprises analysing a radiographic result of the radiographic inspection, the radiographic result comprising a visual representation based upon the radiographic inspection.

4. The method of claim 3, wherein the method comprises storing the radiographic result and subsequently analysing the radiographic visual representation in a post-inspection analysis; and wherein the method comprises analysing the radiographic result for a future fault in the equipment.

5. The method of claim 3, comprising systematically analysing the radiographic result according to a prescribed analysis protocol; and the method comprises automatically analysing the radiographic result by at least partially digitally analysing at least a portion of the radiographic result using image analysis software.

6. The method of claim 3, wherein the method comprises a comparison of the radiographic result with another radiographic result, the another radiographic result being of the equipment obtained at a different time; and wherein the method comprises comparing radiographic results of the same equipment taken during different inspections separated by a significant period of time such as to identify a progression of fault between the two or more inspections.

7. The method of claim 1, the method comprising a measurement of a property of the equipment, the property being associated with an electrical property of the equipment and/or another object associated therewith.

8. The method of claim 7, wherein the property corresponds to a physical dimension of a connection of the equipment.

9. The method of claim 1, the method comprising compiling data from multiple inspections of a single equipment over at least a portion of a lifespan of the single equipment; and wherein the method comprises performing a targeted inspection in dependence on the compiled data.

10. The method of claim 9, the method comprising performing a detailed inspection to access a portion of the equipment for visual inspection, the method comprising performing the detailed inspection in dependence on the radiographic inspection and performing the detailed inspection subsequent to the radiographic inspection; and wherein the method comprises performing the detailed inspection of only targeted equipment or portions in dependence on the radiographic inspection.

11. The method of claim 1, the method comprising replacing a detailed inspection with the radiographic inspection.

12. The method of claim 1, the method comprising determining and following an inspection programme, the method comprising identifying which objects are likely to require inspection and determining a detailed procedure for the inspection of each object, the detailed procedure being determined in dependence on a probable defect; and comprising an associated, validated, method for detecting such defects.

13. The method of claim 1, the method comprising inspecting multiple objects during a single inspection, the single inspection comprising multiple radiographic scans.

14. The method of claim 1, the method comprising compiling an inventory of objects, and radiographic results and analyses associated therewith in a database; and wherein the method comprises grading the objects by criticality in dependence on the radiographic results and analyses.

15. The method of claim 1, wherein the radiographic inspection is at least equivalent to an alternative inspection that a competent person would achieve with a visual inspection or by electrical testing.

16. A portable radiographic imaging apparatus configured to perform the method according to claim 1 on an oil/gas asset.

17. A method of inspecting hazardous area equipment on an oil/gas asset, the method comprising:
   transporting a portable radiographic imaging apparatus into the hazardous area on the oil/gas asset;
   performing a non-invasive, radiographic inspection of an electrical or electronic component of the oil/gas asset's hazardous area equipment using the portable radiographic imaging apparatus;
   analysing a radiographic result of the radiographic inspection, the radiographic result comprising a visual representation of the oil/gas asset's hazardous area equipment based upon the radiographic inspection;
   wherein the method comprises storing the radiographic result and subsequently analysing the radiographic visual representation in a post-inspection analysis; and
   wherein the method comprises analysing the radiographic result for a future fault in the equipment.

18. The method of claim 17, further comprising:
   compiling data from multiple inspections of a single oil/gas asset's hazardous area equipment over at least a portion of a lifespan of the single oil/gas asset's hazardous area equipment; and
   wherein the method comprises performing a targeted inspection in dependence on the compiled data.

\* \* \* \* \*